US012601687B2

(12) United States Patent
Guardiani et al.

(10) Patent No.: US 12,601,687 B2
(45) Date of Patent: Apr. 14, 2026

(54) OPTOELECTRONIC DEVICE FOR THE DETECTION OF SUBSTANCES DISPERSED IN A FLUID

(71) Applicant: FTH S.R.L., Rovereto (IT)

(72) Inventors: Carlo Guardiani, Verona (IT); Lorenzo Pavesi, Trento (IT); Francesco Ferraro, Villafranca di Verona (IT); Niccoló Ardoijno, Bonassola (IT); Mattia Mancinelli, Pergine Valsugana (IT)

(73) Assignee: FTH S.r.L., Rovereto (IT)

( * ) Notice: Subject to any disclaimer, the term of this patent is extended or adjusted under 35 U.S.C. 154(b) by 169 days.

(21) Appl. No.: 18/719,365

(22) PCT Filed: Dec. 27, 2022

(86) PCT No.: PCT/EP2022/087869
§ 371 (c)(1),
(2) Date: Jun. 13, 2024

(87) PCT Pub. No.: WO2023/126399
PCT Pub. Date: Jul. 6, 2023

(65) Prior Publication Data
US 2025/0052688 A1      Feb. 13, 2025

(30) Foreign Application Priority Data
Dec. 29, 2021      (IT) ........................ 102021000032963

(51) Int. Cl.
G01N 21/77      (2006.01)
G01N 21/25      (2006.01)
G01N 21/45      (2006.01)

(52) U.S. Cl.
CPC ....... G01N 21/7746 (2013.01); G01N 21/253 (2013.01); *G01N 2021/458* (2013.01)

(58) Field of Classification Search
CPC ............. G01N 21/7746; G01N 21/253; G01N 2021/458; G02B 6/29343
See application file for complete search history.

(56) References Cited

U.S. PATENT DOCUMENTS

2005/0035278 A1* 2/2005 Margalit ............ G01N 21/7746
250/227.14
2010/0165351 A1 7/2010 Xu et al.
(Continued)

FOREIGN PATENT DOCUMENTS

WO      2009029957 A1      3/2009
WO      2018134348 A1      7/2018

*Primary Examiner* — Sang H Nguyen
(74) *Attorney, Agent, or Firm* — Patterson Intellectual Property Law, PC

(57)      ABSTRACT

The present invention refers to an optoelectronic device for the detection of substances dispersed in a fluid. The optoelectronic device comprises: —a light source adapted to emit a light radiation; —an optical splitter comprising an optical input port optically coupled to said light source and a plurality of optical output ports, said optical splitter being adapted to receive a first light beam at said optical input port and to provide one or more second light beams, each transmissible from a corresponding optical output port; —a plurality of detection stages operatively coupled to said optical splitter and arranged in parallel with one other, —a plurality of control stages arranged in parallel to one another, each control stage being operatively coupled to a corresponding detection stage.

19 Claims, 11 Drawing Sheets

(56)         References Cited

U.S. PATENT DOCUMENTS

| | | | |
|---|---|---|---|
| 2014/0263948 A1 | 9/2014 | Lee et al. | |
| 2016/0047677 A1* | 2/2016 | Heidrich | ............ G01N 21/7746 |
| | | | 356/480 |
| 2016/0282265 A1 | 9/2016 | Su et al. | |
| 2018/0136400 A1* | 5/2018 | Wohlfeil | ............. H01S 3/08027 |
| 2020/0025815 A1* | 1/2020 | Claussen | ................ G02F 1/365 |
| 2020/0166453 A1 | 5/2020 | Lendl et al. | |
| 2021/0381906 A1* | 12/2021 | Tadayon | .................. G01J 5/60 |

\* cited by examiner

OPTOELECTRONIC DEVICE FOR THE DETECTION OF SUBSTANCES DISPERSED IN A FLUID

The present invention refers to an optoelectronic device for the detection of substances dispersed in a fluid.

In the state of the art, numerous examples of optoelectronic devices for the detection of a target substance dispersed in a fluid are known.

Some devices of known type use a closed chain detection system to detect the target substance. A detection device of this type is described in the patent application WO2018/134348A1. Said device comprises an optical resonator having an optical path that crosses an active region able to selectively absorb the substance to be detected. A closed chain control ring allows a light source to emit a light radiation with wavelength locked to the resonance wavelength of the optical resonator.

While presenting undoubted advantages in terms of accuracy and measurement resolution, the solutions of this type, currently available, are unsuitable for producing multi-sensing optoelectronic devices able to detect in parallel substances different from one another, analyse different substance samples simultaneously or carry out several analyses on the same substance sample.

In fact, the production of a multi-sensing optoelectronic device requires an array of laser emitters with wavelength that can be modulated in parallel. This would entail unacceptable industrial costs. Furthermore, the overall dimensions of the detection device would be so large as to jeopardise easy use of the detection device.

The main task of the present invention is to provide an optoelectronic device for the detection of substances dispersed in a fluid which overcomes the above-mentioned drawbacks.

Within this task, one of the objects of the present invention is to provide a multi-sensing optoelectronic device capable of performing in parallel multiple detections of substances dispersed in a fluid, for example to detect several substances dispersed in a fluid, to analyse different substance samples simultaneously or to perform several analyses on the same substance sample.

A further object of the present invention is to provide an optoelectronic device that offers high performance in terms of accuracy, measurement resolution and response times in the detection of each substance of interest.

A further object of the present invention is to provide an optoelectronic device that has reduced overall dimensions and is simple and practical to use.

Last but not least, a further object of the present invention is to provide an optoelectronic device that is simple to produce industrially at competitive costs.

This task and these objects, in addition to other objects that will appear evident from the following description and attached drawings, is achieved, according to the invention, by an optoelectronic device for the detection of substances dispersed in a fluid, according to claim 1 and the relative dependent claims described below.

In a general definition, the optoelectronic device, according to the invention, comprises:

a light source adapted to emit a light radiation;

an optical splitter comprising an optical input port optically coupled to the light source and a plurality of optical output ports. The optical splitter is adapted to receive a first light beam at the input port and transmit one or more second light beams, each from a corresponding optical output port;

a plurality of detection stages operatively coupled to the optical splitter and arranged in parallel to one another. Each detection stage includes a photonic circuit adapted to receive in input a light radiation, coming from the optical splitter, and transmit in output at least one light radiation.

According to the invention, the photonic circuit comprises:

an optical input adapted to receive and transmit a light radiation. Said optical input is optically coupled to a corresponding optical output port of the optical splitter;

a first optical structure adapted to receive and transmit a light radiation. The first optical structure is optically coupled to the optical input and has a first optical path length;

a second optical structure adapted to receive and transmit a light radiation. The second optical structure is optically coupled to the first optical structure and has a second optical path length. The second optical structure comprises an active region arranged to come into contact with a fluid in which a target substance is dispersed and to selectively absorb the target substance. The second optical path length of the second optical structure varies when the active region absorbs the target substance;

an adjustment element of the optical path length operatively coupled to the first optical structure and arranged to adjust the first optical path length of the first optical structure in response to a control signal received in input;

at least one optical output adapted to receive and transmit a light radiation. The above-mentioned at least one optical output is optically coupled to at least one of said optical input, said first optical structure and said second optical structure.

Preferably, the above-mentioned first and second optical structures are realized as distinct parts of the corresponding photonic circuit.

Preferably, said first optical structure is realized in such a way to come into contact with the fluid in contact with said second optical structure.

According to the invention, each detection stage further includes at least one optical detector optically coupled with the above-mentioned at least one optical output. Each optical detector is arranged to provide a detection signal indicative of an optical power of a light radiation transmitted by a corresponding optical output to which it is optically coupled.

According to the invention, the optoelectronic device further comprises a plurality of control stages arranged in parallel to one another. Each control stage is operatively coupled to a corresponding detection stage and is arranged to receive and process at least one detection signal provided by at least one optical detector of the detection stage. Each control stage is adapted to provide, in response to said at least one detection signal:

a control signal for the adjustment element of the photonic circuit of the corresponding detection stage. Said control signal is configured to adjust the first optical path length of the first optical structure of the photonic circuit so that the optical power of the light radiation transmitted by at least one optical output of the photonic circuit takes on a desired value, when the second optical path length of the second optical structure varies due to the target substance absorbed by the active region of said second optical structure;

a measurement signal indicative of a presence or concentration of the target substance in the fluid in contact with the active region of the second optical structure.

Preferably, said measurement signal is calculated based on said control signal.

According to an aspect of the invention, the optical splitter comprises a plurality of optical paths adapted to couple the optical input port to the optical output ports of said optical splitter.

According to a further aspect of the invention, the optical splitter comprises a plurality of optical switches adapted to select an optical path of said optical splitter.

According to other embodiments of the invention, each photonic circuit comprises:

a first optical resonator having a first ring optical path and optically coupled to the optical input of the photonic circuit. The first optical structure of the photonic circuit is formed by the above-mentioned first optical resonator; and a second optical resonator having a second ring optical path and optically coupled to the optical input of the photonic circuit. The second optical structure of the photonic circuit is formed by the above-mentioned second optical resonator.

The photonic circuit comprises a first optical output optically coupled to the optical input. In this case, the detection stage comprises a first optical detector optically coupled to the first optical output of the photonic circuit.

Alternatively, the photonic circuit comprises a second optical output optically coupled to the first and second optical resonators of the photonic circuit. In this case, the detection stage comprises a second optical detector optically coupled to the second optical output of the photonic circuit.

As a further alternative, the photonic circuit comprises a first optical output optically coupled to the optical input of the photonic circuit and a second optical output optically coupled to the first and second optical resonators of the photonic circuit. In this case, the detection stage comprises a first optical detector and a second optical detector optically coupled to the first optical output and to the second optical output of the photonic circuit, respectively.

According to other embodiments of the invention, each photonic circuit comprises:

a first optical resonator having a first ring optical path and optically coupled to the optical input of the photonic circuit. The first optical structure of the photonic circuit is formed by the above-mentioned first optical resonator; and a second optical resonator having a second ring optical path and optically coupled to the first optical resonator of the photonic circuit. The second optical structure of the photonic circuit is formed by the above-mentioned second optical resonator.

The photonic circuit comprises a first optical output optically coupled to the optical input. In this case, the detection stage comprises a first optical detector optically coupled to the first optical output of the photonic circuit.

Alternatively, the photonic circuit comprises a second optical output optically coupled to the second optical resonator of the photonic circuit. In this case, the detection stage comprises a second optical detector optically coupled to the second optical output of the photonic circuit.

As a further alternative, the photonic circuit comprises a first optical output optically coupled to the optical input of the photonic circuit and a second optical output optically coupled to the second optical resonator of the photonic circuit. In this case, the detection stage comprises a first optical detector and a second optical detector optically coupled to the first optical output and to the second optical output of the photonic circuit, respectively.

According to other embodiments of the invention, each photonic circuit comprises:

an optical resonator having a ring optical path and optically coupled to the optical input of the photonic circuit. The first optical structure of the photonic circuit is formed by the above-mentioned optical resonator; and a further optical path optically coupled to the optical input and to an optical output of the photonic circuit. The second optical structure of the photonic circuit is formed by the above-mentioned second optical resonator.

According to other embodiments of the invention, each photonic circuit comprises:

an optical beam splitter optically coupled to the optical input of the photonic circuit;

an optical beam coupler optically coupled to an optical output of the photonic circuit;

a first optical path optically coupled to the optical beam splitter and to the optical beam coupler. The first optical structure is formed by the above-mentioned first optical path;

a second optical path optically coupled to the optical beam splitter and to the optical beam coupler, in parallel to the first optical path. The second optical structure is formed by the above-mentioned second optical path.

Preferably, the first optical path is arranged in such a way to come into contact with said fluid.

Further characteristics and advantages of the present invention will become clearer by referring to the following description and the attached figures, provided for purely illustrative non-limiting purposes, in which.

Figure 1:
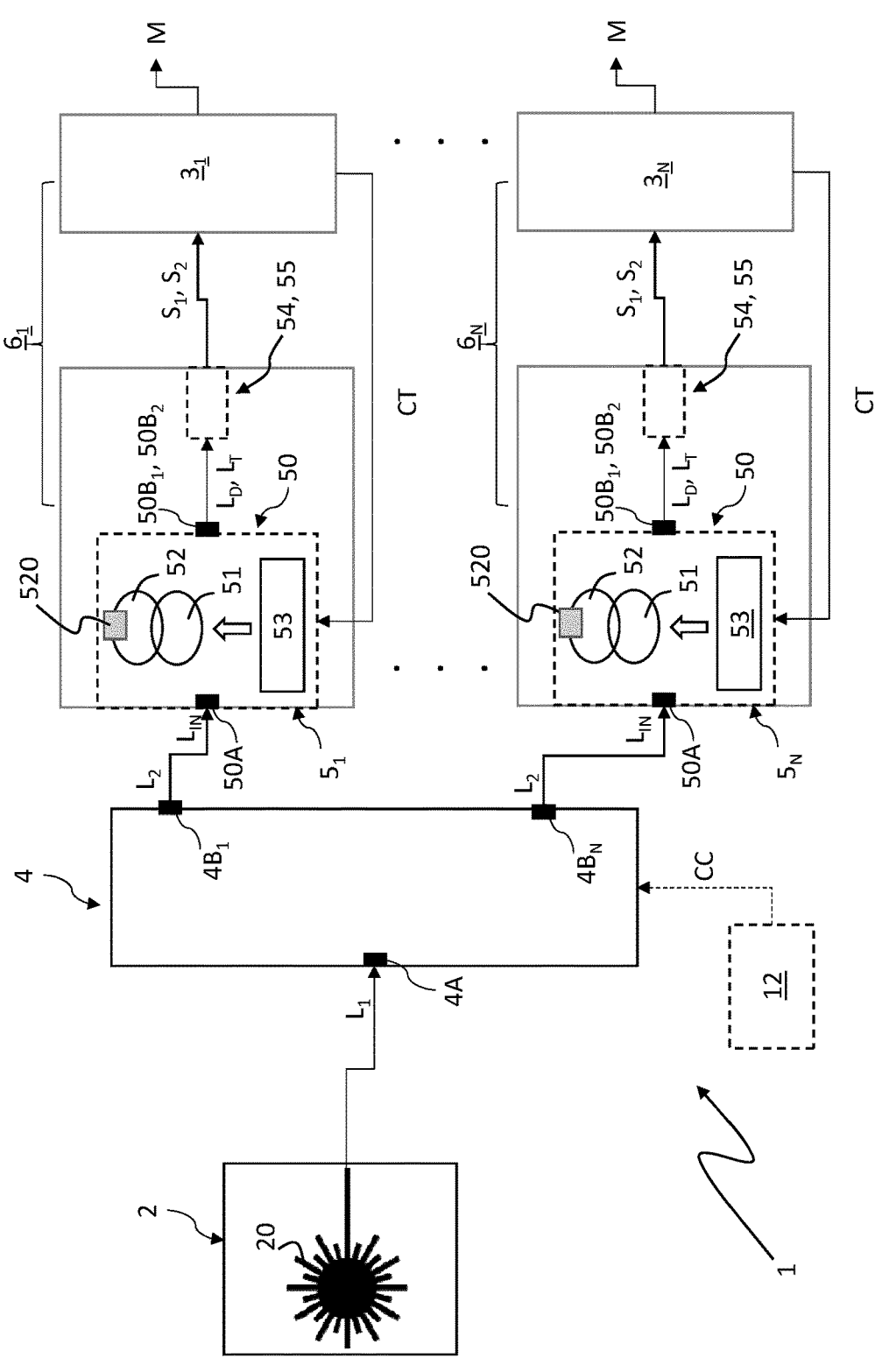
FIG. 1 illustrates, by way of example, the structure and the operation of the optoelectronic device according to the invention.

With reference to the cited figures, the present invention refers to a multi-sensing optoelectronic device 1 capable of performing, in parallel, multiple detections of substances dispersed in a fluid.

In principle, the target substances to be detected, by means of the optoelectronic device 1, can be of any type, for example a material, a compound, a chemical or biological substance. Also the fluid in which each target substance is dispersed can be of any type: a liquid (for example of biological origin, a process liquid or a chemical solution) or a gas (for example a process gas).

The optoelectronic device 1 comprises a light source 2 adapted to emit a light radiation $L_1$.

Preferably, the light source 2 comprises a laser emitter, for example a DFB laser or laser of similar type.

In general, the light source 2 emits light with wavelength in the order of microns, for example in a range between 0.8 µm and 1.6 µm.

Preferably, the light source 2 emits light with constant wavelength $\lambda_0$.

However, according to some embodiments of the invention, the light source 2 emits light with variable wavelength in a wavelength range centred on a predefined wavelength Ar. For example, the light source 2 can emit a light radiation having variable wavelength in a range [$\lambda_r$–5 pm, $\lambda_r$+5 pm], where $\lambda_r$ is a wavelength value in the order of microns, as indicated above.

Preferably, the variation in wavelength within the above-mentioned range occurs in a predefined pattern, for example of sinusoidal type.

The light source 2 can advantageously include appropriate control circuits to control the operation thereof or appropriate optical components to treat the light radiation emitted before transmitting it in output.

In general, the light source 2 can be provided according to solutions of known type and will not be described here in further detail for the sake of brevity.

According to the invention, the optoelectronic device 1 comprises an optical splitter 4 having an optical input port 4A and a plurality of optical output ports 4B$_1$, 4B$_N$, arranged in parallel to one another.

The optical input port 4A of the optical splitter is optically coupled to the light source 2 so as to receive the light radiation $L_1$ transmitted by the latter.

Preferably, the optoelectronic device 1 comprises a waveguide (not illustrated) appropriately arranged, according to known methods, to optically couple the light source 2 with the optical splitter 4.

Each optical output port 4B$_1$, 4B$_N$ of the optical splitter can be optically coupled to the optical input port 4A so that it can transmit in output a light radiation $L_2$. In general, the optical splitter 4 is adapted to receive a first light beam $L_1$ at the optical input port 4A and to provide one or more second light beams $L_2$, each of which can be obtained by sub-splitting or diverting the light beam $L_1$ and is transmitted by a corresponding optical output port 4B$_1$, 4B$_N$.

Each optical output port 4B$_1$, 4B$_N$ is adapted to transmit a light radiation $L_2$ having wavelength corresponding to the wavelength of the light radiation $L_1$ received from the optical input port 4A.

According to the type of structure and operation scheduled for the optical splitter 4, the power of the light radiation $L_2$ transmitted by an optical output port 4B$_1$, 4B$_N$ can substantially coincide with the power of the light radiation $L_1$ received by the optical input port 4A or be a fraction of the latter.

The optical splitter 4 can be produced according to technical solutions of known type.

Figure 2:
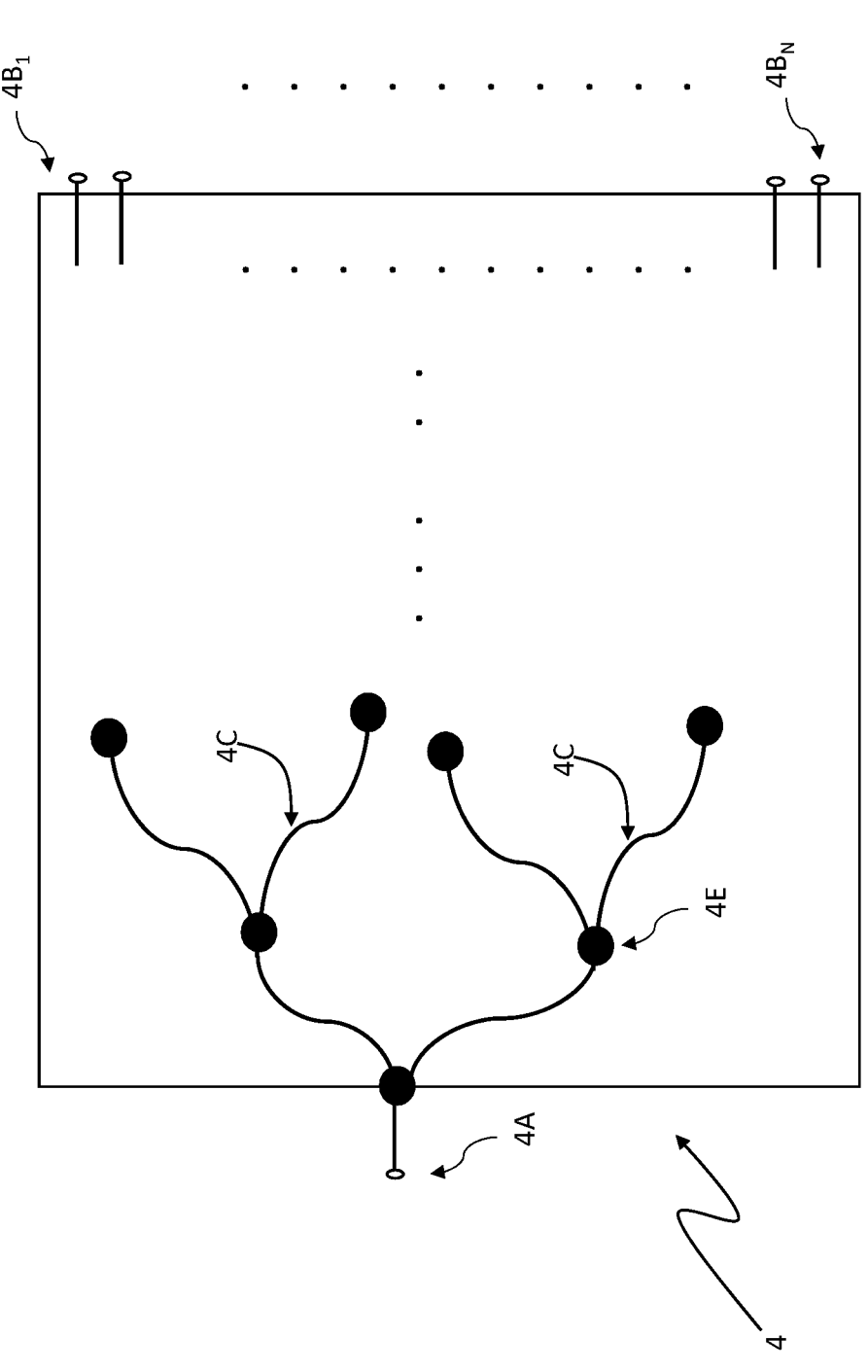
FIGS. 2-3 illustrate, by way of example, some possible embodiments of a part of the optoelectronic device, according to the invention.
Figure 3:
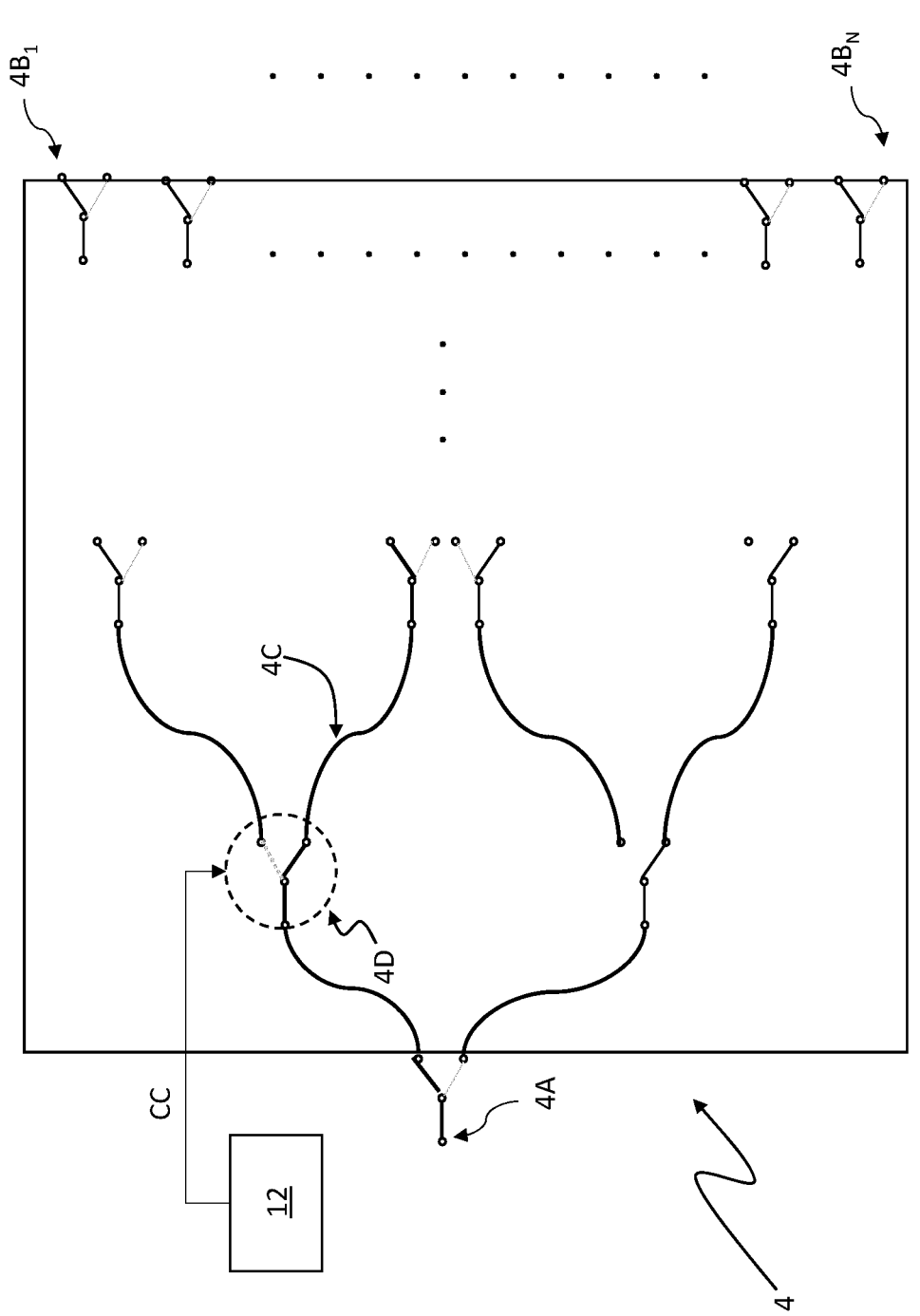

Preferably, as illustrated in FIGS. 2-3, the optical splitter 4 comprises a plurality of optical paths 4C arranged, for example according to a binary tree structure, to optically couple the optical input port 4A to the optical output ports 4B$_1$, 4B$_N$.

According to some embodiments (FIG. 2), the optical paths 4C of the optical splitter 4 are arranged with a predefined geometry. In this case, the optical splitter 4 comprises, at the nodes of a tree structure, appropriate beam separators 4E. Each beam separator 4E comprises an input terminal and at least a pair of output terminals and is capable of sub-splitting a light beam in input into at least a pair of light beams. In this way, each beam separator 4E is able to optically couple a section of optical path upstream, coupled to the input terminal, to at least one pair of sections of optical path downstream, each coupled to an output terminal.

During operation, all the optical paths 4C are crossed by a light radiation and the optical splitter 4 sub-splits the light beam $L_1$, received at the optical input port 4A, into N light beams $L_2$ parallel to one another, where N is the number of optical output ports 4B$_1$, 4B$_N$. A generic optical output port

4B$_1$, 4B$_N$ is thus able to transmit a light radiation $L_2$ having power corresponding to a fraction of the power of the light radiation $L_1$ received by the optical input port 4A.

According to other embodiments (FIG. 3), each optical path 4C of the optical splitter can be selectively activated. In this case, the optical splitter 4 comprises, at the nodes of the above-mentioned tree structure, a plurality of optical switches 4D, for example SPDT (Single Pole Double Through) optical switches.

Each optical switch 4D comprises an input terminal and at least one pair of output terminals and is able to divert a light beam in input towards a single selected output terminal. In this way, it is able to optically couple, in a selective manner, a section of optical path upstream, coupled to the input terminal, to a single section of optical path downstream, coupled to the selected output terminal.

During operation, a single optical path 4C can be selected. The optical splitter 4 thus provides, at a single optical output port activated, a light radiation $L_2$ having power substantially corresponding (barring any leaks) to the power of the light radiation $L_1$ received in input. Quite clearly, in this case, the optical beam $L_2$, provided in output, is obtained by diverting the light beam $L_1$, received in input, along the optical path 4C selected by means of the optical switches 4D.

The different optical paths 4C of the optical splitter can be selected so that the optical output ports 4B$_1$, 4B$_N$ are activated to transmit light in output, according to predefined time patterns, for example in a sequential manner.

Each optical output port 4B$_1$, 4B$_N$ can be activated for the same time interval. According to other possible solutions, however, the optical output ports 4B$_1$, 4B$_N$ can be activated for time intervals having differentiated duration and calculated by means of appropriate algorithms based on the overall time required to perform the desired measurement.

Preferably, the optical switches 4D can be electronically controlled by means of appropriate control signals CC. For said purpose, the optoelectronic device 1 advantageously comprises a controller 12 operatively associated with the splitter 4.

According to the invention, the optoelectronic device 1 comprises a plurality of detection stages 5$_1$, 5$_N$ optically coupled to the optical splitter 4 and arranged in parallel to one another.

According to the invention, each detection stage 5$_1$, 5$_N$ comprises a photonic circuit 50 adapted to receive in input a light radiation from the optical splitter 4.

Each photonic circuit 50 comprises an optical input 50A optically coupled to a corresponding optical output port 4B$_1$, 4B$_N$ of the optical splitter 4 to receive and transmit a light radiation $L_{IN}$ coming from said optical output port.

In general, the light radiation $L_{IN}$ received and transmitted by the optical input 50A substantially coincides with the light radiation $L_2$ transmitted by the corresponding optical port 4B$_1$, 4B$_N$ coupled to it.

Preferably, for each detection stage 5$_1$, 5$_N$, the optoelectronic device 1 comprises a waveguide (not illustrated) appropriately arranged, according to known methods, to optically couple the optical input 50A of the photonic circuit 50 to the corresponding optical output port 4B$_1$, 4B$_N$ of the optical splitter 4.

Each photonic circuit 50 comprises at least an optical output 50B$_1$, 50B$_2$ adapted to transmit in output at least one light radiation $L_T$, $L_D$.

As better illustrated below, according to some embodiments of the invention, each photonic circuit 50 comprises a single optical output $50B_1$ or $50B_2$ adapted to transmit in output a corresponding light radiation $L_T$ or $L_D$ (FIGS. 4, 5, 7, 8, 10, 11, 13, 14).

Figure 6:
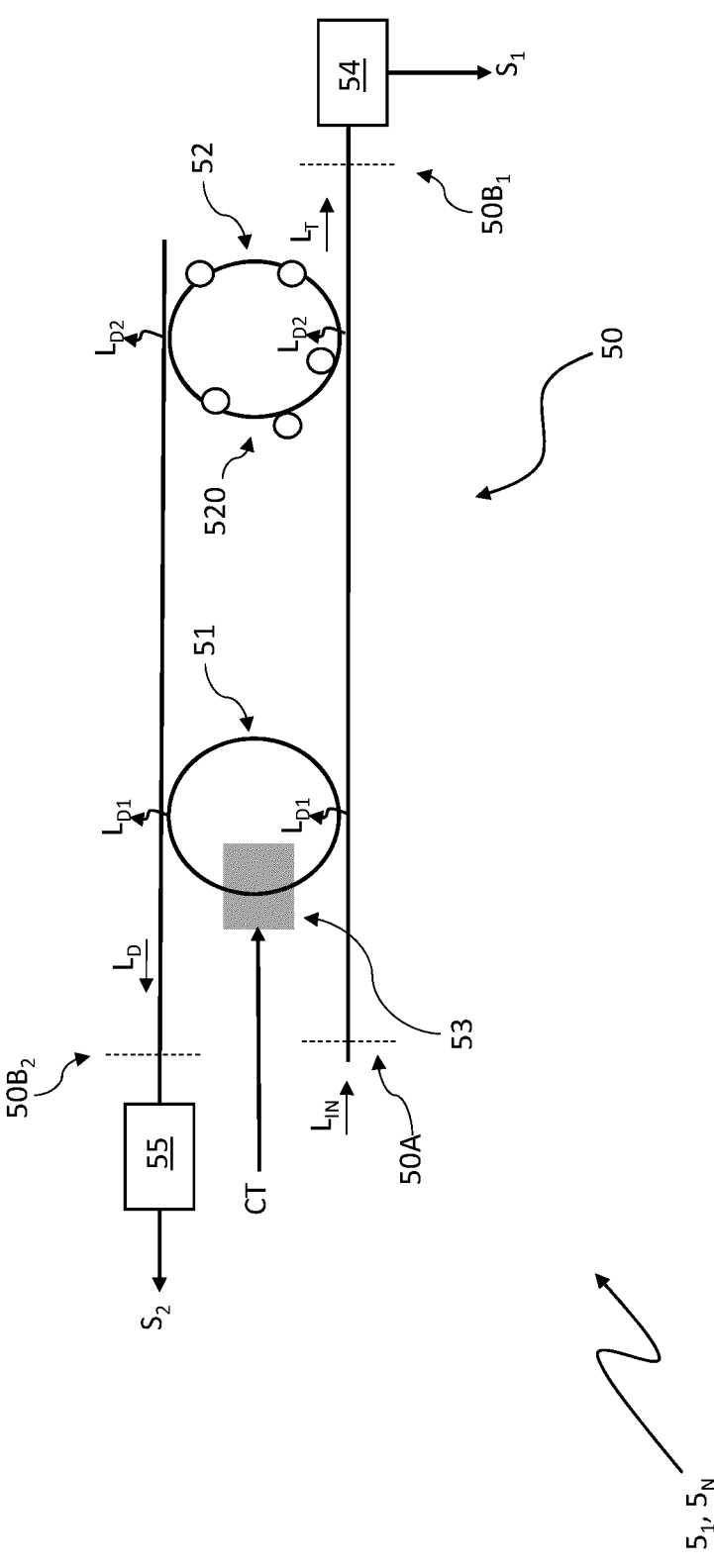
Figure 9:
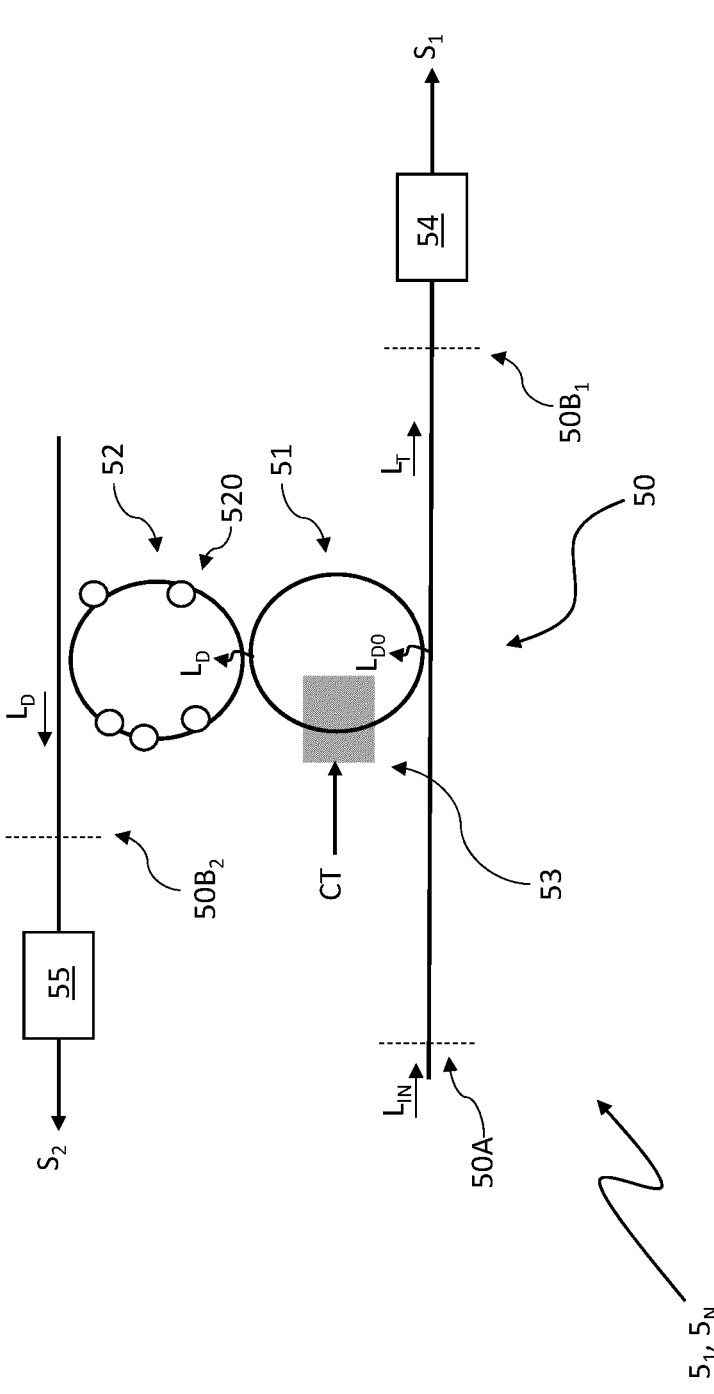

According to other embodiments, each photonic circuit 50 comprises a pair of optical outputs $50B_1$ and $50B_2$, each adapted to transmit in output a corresponding light radiation $L_T$, $L_D$ (FIGS. 6, 9, 12).

Each photonic circuit 50 comprises a first optical structure 51 and a second optical structure 52 optically coupled to each other.

Preferably, the first and second optical structures 51, 52 are realized as distinct parts of the corresponding photonic circuit 50. In practice, they are realized in such a way not to share common portions of the corresponding photonic circuit.

The first optical structure 51 is optically coupled to the optical input 50A.

According to some embodiments of the invention (FIGS. 4-6, 10-11), also the second optical structure 52 can be coupled to the optical input 50A.

According to some embodiments of the invention (FIG. 7), only the first optical structure 51 is optically coupled to a corresponding first optical output $50B_1$.

According to other embodiments of the invention (FIG. 8), only the second optical structure 52 is optically coupled to a corresponding second optical output $50B_2$ of the photonic circuit 50.

According to further embodiments of the invention (FIG. 9), each optical structure 51, 52 is optically coupled to a corresponding optical output $50B_1$, $50B_2$.

According to further embodiments of the invention (FIGS. 10, 11), both the optical structures 51, 52 are optically coupled to the same optical output $50B_1$.

Preferably, for each detection stage $5_1$, $5_N$, the photonic circuit 50 comprises appropriate waveguides and beam separators (not illustrated) appropriately arranged, according to known methods, to optically couple the optical structures 51, 52 to the optical input 52 and the optical outputs $50B_1$, $50B_2$, according to the methods illustrated above.

Each optical structure 51, 52 of the photonic stage 50 includes an optical path for a light radiation and is characterised by its own optical path length $\ell_1$, $\ell_2$.

Preferably, the optical structures 51, 52 are arranged so as to have the same optical path length at rest (namely when the optoelectronic device is not performing a measurement). In general, however, said optical structures can have optical path lengths different from each other.

For the sake of clarity, in the context of the present invention, the optical path length $\ell$ of an optical structure is defined as:

$$\ell = n * \ell_g$$

where n is the refraction index of the material crossed by the light radiation that travels along the optical structure and $\ell_g$ is the geometric length of the path followed by the light radiation along the optical structure.

The second optical structure 52 comprises an active region 520 crossed by the light radiation that travels along said optical structure and is arranged to come into contact with a target substance, in particular with the fluid in which the target substance is dispersed.

The active region 520 is arranged to selectively absorb the target substance to be detected. For said purpose, it can advantageously comprise a material (which can be of known type) capable of selectively interacting with the target substance.

The refraction index $n_2$ of the material of the active region 520 varies when the above-mentioned material selectively absorbs a certain quantity of target substance. According to the relation illustrated above, this means that also the optical path length $\ell_2$ of the second optical structure 52 varies when the target substance is absorbed by the active region 520.

Preferably, the first optical structure 51 is realized in such a way to come into contact with the fluid in contact with the second optical structure 52. In this case, the effects of possible variations of physical quantities related to the fluid (e.g. temperature or density variations) are naturally self-compensated.

Each photonic circuit 50 comprises an adjustment element 53 of the optical path length operatively coupled to the first optical structure 51.

The adjustment element 52 is arranged to adjust the first optical path length $\ell_1$ of the first optical structure 51, advantageously by varying the refraction index $n_1$ of the material crossed by the light radiation that passes through said optical structure.

For said purpose, in response to control signals CT received in input, the adjustment element 53 applies a force field to the material of the first optical structure 51 or modifies the physical properties of the above-mentioned material.

It is highlighted how the adjustment element 53 has substantially no influence on the first optical structure 51 as the first and second optical structures are preferably distinct one from another.

The adjustment element 53 can be produced according to technical solutions of known type.

According to some embodiments, the adjustment element 53 can comprise a capacitive electronic circuit (for example comprising one or more capacitors) capable of modifying the refraction index n of the material of the first optical structure 51 by applying an electric field having adjustable intensity, in response to appropriate control signals CT received in input.

According to other embodiments, the adjustment element 53 can comprise a heater circuit (for example comprising one or more Peltier cells or electric resistors) capable of modifying the refraction index $n_1$ of the material of the first optical structure 51 by varying the temperature thereof, in response to appropriate control signals CT received in input.

According to further embodiments, the adjustment element 53 can comprise a PIN diode coupled to a waveguide of the first optical structure 51 so as to inject or empty charge carriers into or from the above-mentioned waveguide, in response to appropriate control signals CT received in input.

According to the invention, each detection stage $5_1$, $5_N$ comprises at least one optical detector 54, 55, each optically coupled to a corresponding photonic circuit 50, in particular to a corresponding optical output $50B_1$, $50B_2$ of said photonic circuit.

Advantageously, each detection stage $5_1$, $5_N$ comprises an optical detector 54, 55 optically coupled to each optical output $50B_1$, $50B_2$ of the photonic circuit 50 so as to receive the light radiation $L_D$, $L_T$ coming from the latter.

According to some embodiments of the invention (FIGS. 4, 5, 7, 8, 10, 11), the detection stage $5_1$, $5_N$ comprises one single optical detector 54 or 55 optically coupled to the single optical output $50B_1$ or $50B_2$ of the photonic circuit 50.

According to other embodiments of the invention (FIGS. 6, 9), the detection stage $5_1$, $5_N$ comprises a pair of optical detectors 54, 55, each optically coupled to a corresponding optical output $50B_1$, $50B_2$ of the photonic circuit 50.

Each optical detector 54, 55 is advantageously arranged to provide detection signals $S_1$, $S_2$ (of electric type) indicative of an optical power of the light radiation coming from a corresponding optical output $50B_1$, $50B_2$.

The optical detectors 54, 55 can be produced according to known methods.

Preferably, each optical detector 54, 55 comprises a photodiode operatively associated with an electronic circuit for processing the detection signals $S_1$, $S_2$ provided in output.

Preferably, each detection stage $5_1$, $5_N$ comprises appropriate waveguides and beam separators (not illustrated) appropriately arranged, according to known methods, to optically couple each optical output $50B_1$, $50B_2$ of the photonic circuit 50 to a corresponding optical detector 54, 55. According to the invention, the optoelectronic device 1 comprises a plurality of control stages $3_1$, $3_N$ arranged in parallel to one another.

Each control stage $3_1$, $3_N$ is operatively coupled to a corresponding detection stage $5_1$, $5_N$ and is arranged to receive and process the detection signals $S_1$, $S_2$, provided by each optical detector 54, 55 of the corresponding detection stage.

According to some embodiments of the invention (FIGS. 4, 5, 7, 8, 10, 11), the control stage $3_1$, $3_N$ receives a single detection signal $S_1$ or $S_2$ provided by a single optical detector 54 or 55 of the corresponding detection stage $5_1$, $5_N$.

According to other embodiments of the invention (FIGS. 6, 9), the control stage $3_1$, $3_N$ receives a pair of detection signals $S_1$, $S_2$ provided by a pair of optical detectors 54, 55 of the corresponding detection stage $5_1$, $5_N$.

The operative coupling between each optical detector 54, 55 and the corresponding control stage $3_1$, $3_N$ can be made by means of appropriate optoelectronic couplings of known type.

Each control stage $3_1$, $3_N$ is adapted to provide, in response to the detection signals $S_1$, $S_2$, control signals CT for the adjustment element 53 of the photonic circuit 50 included in the corresponding detection stage $5_1$, $5_N$ in order to adjust the optical path length $\ell_1$ of the first optical structure 51 of the photonic circuit.

The control signals CT are configured to adjust the first optical path length $\ell_1$ of the first optical structure 51 so that the optical power of the light radiation $L_T$, $L_D$ transmitted from at least one optical output $50B_1$, $50B_2$ of the photonic circuit takes on a desired value when the second optical path length $\ell_2$ of the second optical structure 52 varies due to the target substance absorbed by the active region 520 of the second optical structure.

In practice, the first optical path length $\ell_1$ of the first optical structure 51 is adjusted so that the optical power of the light radiation $L_T$, $L_D$ transmitted by at least one optical output $50B_1$, $50B_2$ of the photonic circuit follows a certain desired value.

According to some embodiments of the invention in which the photonic circuit comprises a single optical output $50B_1$ or $50B_2$ (FIGS. 4-5, 7-8, 10-11), the control signals CT are advantageously configured to adjust the first optical path length $\ell_1$ of the first optical structure 51 so that the optical power of the light radiation $L_T$, $L_D$ transmitted from said optical output $50B_1$ or $50B_2$ maintains a maximum or minimum value, when the second optical path length $\ell_2$ of the second optical structure 52 varies due to the target substance absorbed by the active region 520. In this case, therefore, the desired optical power value followed for the radiation $L_T$, $L_D$ transmitted by the single optical output $50B_1$ or $50B_2$ is a maximum or minimum value which can be constant or variable over time, as required.

According to other embodiments of the invention in which the photonic circuit comprises a pair of optical outputs $50B_1$, $50B_2$ (FIGS. 7, 9), the control signals CT are advantageously configured to adjust the first optical path length $\ell_1$ of the first optical structure 51 so that a difference $\Delta P$ in optical power between the light radiations $L_T$, $L_D$ transmitted by said optical outputs $50B_1$, $50B_2$ takes on a constant value (preferably null) when the second optical path length $\ell_2$ of the second optical structure 52 varies due to the target substance absorbed by the active region 520. In this case, therefore, the desired optical power value followed for the radiation $L_T$, $L_D$ transmitted by each optical output $50B_1$, $50B_2$ is a constant value, preferably the same constant value. In this way, the optical power differential between the light radiations $L_T$, $L_D$ transmitted by the optical outputs $50B_1$, $50B_2$ takes on a constant desired value, preferably null.

In addition to the control functions illustrated above, each control stage $3_1$, $3_N$ is adapted to provide, in response to the detection signals $S_1$, $S_2$, a measurement signal M indicative of a presence or concentration of the target substance in the fluid in contact with the active region 520 of the second optical structure 52 of the corresponding photonic circuit 50.

Each electronic stage $3_1$, $3_N$ implements, in cooperation with the corresponding adjustment element 53 and the corresponding detection devices 54 and/or 55, a feedback circuit adapted to control the first optical path length $\ell_1$ of the first optical structure 51 of the corresponding photonic circuit 50 so that the latter constantly follows every variation in the second optical path length $\ell_2$ of the second optical structure 52. This allows measurement of the presence or concentration of the target substance in the fluid in contact with the active region 520.

The absorption of the target substance by the active region 520 of the second optical structure 52 of the photonic circuit 50, in fact, entails a variation $\Delta\ell_2$ in the refraction index $n_2$ of the active region 520. This causes a variation $\Delta\ell_2$ in the optical path length $\ell$ of the second optical structure 52, which can be expressed by the following relation:

$$\Delta\ell_2 = \Delta n_2 * \ell_g$$

where $\ell_g$ is the geometric length of the path followed by the light radiation in the second optical structure.

Every variation $\Delta\ell_2$ in the optical path length $\ell_2$ of the second optical structure 52 thus entails a corresponding variation in the optical power of the light radiation in output from the photonic circuit 50.

In principle, every variation $\Delta n_2$ in the refraction index $n_2$ of the active region 520, due to absorption of the active substance by the active region, could be measured based on the variation in optical power $\Delta P$ of the light radiation provided in output by the photonic circuit 50.

Preferably, however, the measurement signal M is calculated based on the control signal CT sent to the adjustment element 53 of the optical path length operatively coupled with the first optical structure 51 of the photonic circuit.

As illustrated above, the control signal CT is configured to adjust the first optical path length $\ell_1$ of the first optical structure 51 of the corresponding photonic circuit 50 so that the optical power of the light radiation $L_T$, $L_D$ transmitted by at least one optical output 50B$_1$, 50B$_2$ of the photonic circuit follows a desired value when the second optical path length $\ell_2$ of the second optical structure varies due to the target substance absorbed by the active region 520 of the second optical structure, therefore determining a corresponding variation in optical power ΔP of the light radiation provided in output by the photonic circuit 50.

Therefore, the trend of the control signal CT depends ultimately on the variation $\Delta n_2$ in the refraction index $n_2$ of the active region 520 caused by absorption of the target substance. By appropriately processing the control signal CT, generated to adjust the first optical path length $\ell_1$ of the first optical structure 51 of the photonic circuit, it is possible to obtain the measurement signal M indicative of a presence or concentration of the target substance.

The optoelectronic device 1 can be produced according to a variety of embodiments, in particular with regard to the detection stage 5$_1$, 5$_N$.

Some possible technical solutions for producing the detection stage 5$_1$, 5$_N$ are described below.

EMBODIMENT #1

Figure 4:
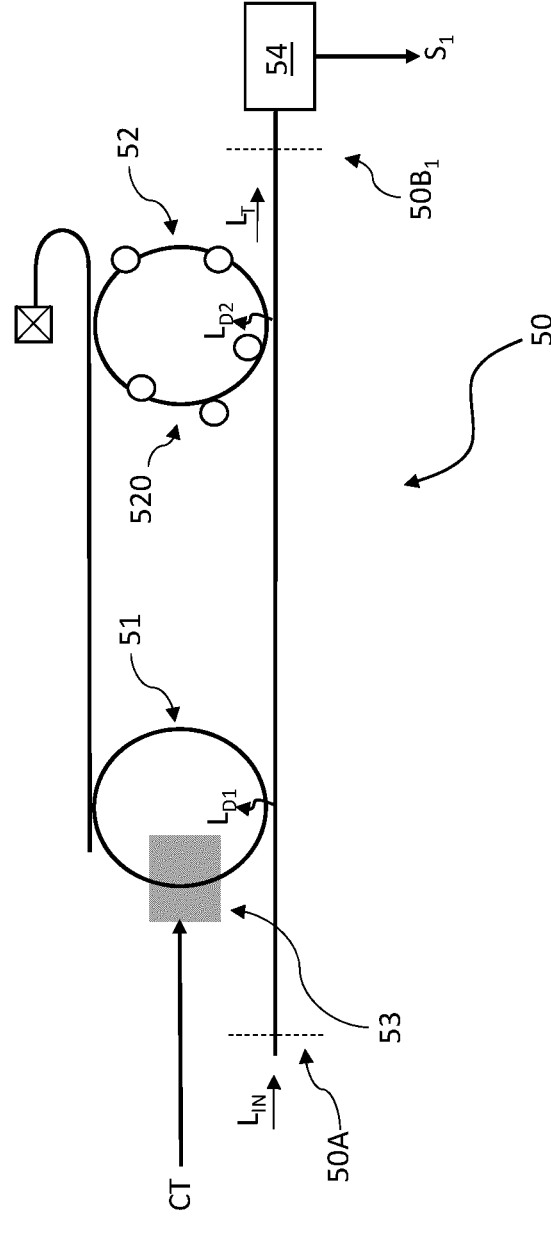
FIGS. 4-11 illustrate, by way of example, some possible embodiments of a further part of the optoelectronic device, according to the invention.
Figure 4:
Figure 5:
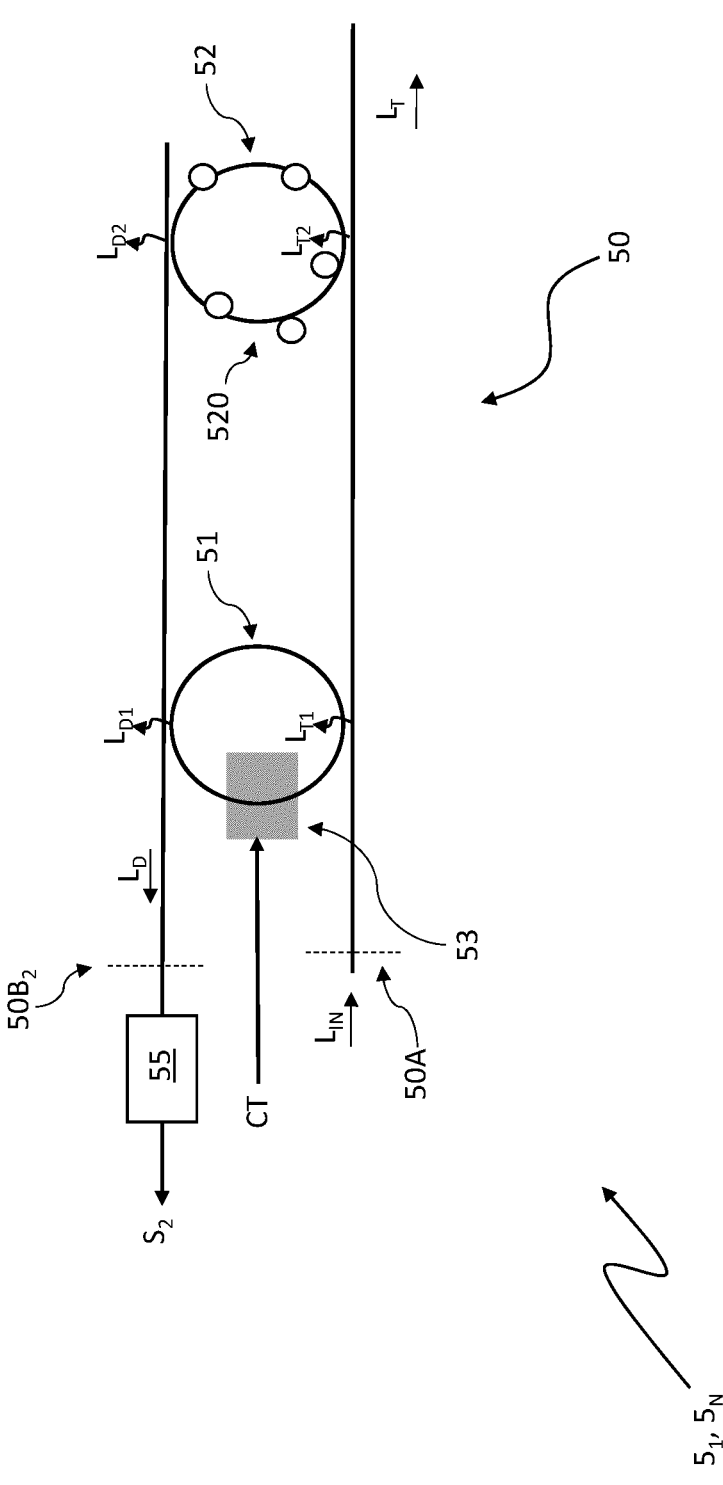

FIGS. 4-6 illustrate another possible embodiment of the invention.

According to said solution, the photonic circuit 50 comprises a first optical resonator 51 that includes a first ring optical path and a second optical resonator 52 that includes a second ring optical path.

The first optical resonator 51 forms the first optical structure while the second optical resonator 52 forms the second optical structure.

The first optical resonator 51 and the second optical resonator 52 are spaced from each other and are both optically coupled to each other and to the optical input 50A.

The adjustment element 53 of the optical path length, for example formed of a PIN diode coupled to the waveguide of the first optical resonator 51 or formed of a heating element, is arranged at the first optical resonator 51.

The second optical resonator 52 comprises an active region 520 designed to come into contact with the fluid in which the target substance is dispersed.

According to the embodiment of FIG. 4, the photonic circuit 50 comprises only a first optical output 50B$_1$ optically coupled to the optical input 50A. In this case, the detection stage 5$_1$, 5$_N$ comprises only a first optical detector 54 optically coupled to the first optical output 50B$_1$.

According to the variation of FIG. 5 (dual with respect to that of FIG. 4), the photonic circuit 50 comprises only a second optical output 50B$_2$ optically coupled to the first optical resonator 59. In this case, the detection stage 5$_1$, 5$_N$ comprises only a second optical detector 55 optically coupled to the first optical output 50B$_1$.

According to the embodiment of FIG. 6, the photonic circuit 50 comprises a first optical output 50B$_1$ optically coupled to the optical input 50A, and a second optical output 50B$_2$ optically coupled to the first optical resonator 59. In this case, the detection stage 5$_1$, 5$_N$ comprises a first optical detector 54 optically coupled to the first optical output 50B$_1$ and a second optical detector 55 optically coupled to the second optical output 50B$_2$.

Operation of the detection stage 5$_1$, 5$_N$ is now briefly described.

The photonic circuit 50 receives in input a light radiation $L_{IN}$.

In general, said light radiation is split into a first portion $L_{D1}$ transmitted to the first optical resonator 51, a second portion $L_{D2}$ transmitted to the second optical resonator 52 and a third portion $L_T$ not transmitted to the optical resonators 51, 52.

The optical path length $\ell_2$ of the second optical resonator 52 varies when the target substance is absorbed by the active region 520.

Every variation in the optical paths $\ell_1$, $\ell_2$ of the optical resonators 51, 52 entails a power variation in the light radiation $L_T$, not transmitted to the optical resonators 51, 52, and a power variation, inverse to the preceding one, in the light radiation $L_D = L_{D1} + L_{D2}$ received and conveyed by the pair of optical resonators 51, 52 as a whole.

In the embodiment of FIG. 4, the light radiation $L_T$ is transmitted only to the optical output 50B$_1$ of the photonic circuit 50. The first optical detector 54, optically coupled to the optical output 50B$_1$, thus provides a first detection signal $S_1$ indicative of the light radiation $L_T$.

In the embodiment of FIG. 5, the light radiation $L_D = L_{D1} + L_{D2}$ is transmitted, by the pair of optical resonators 51, 52 as a whole, only to the optical output 50B$_2$ of the photonic circuit 50. The second optical detector 55, optically coupled to the second optical output 50B$_2$, thus provides a second detection signal $S_2$ indicative of the light radiation $L_D$.

In the embodiment of FIG. 6, the light radiation $L_T$ is transmitted to the first optical output 50B$_1$ of the photonic circuit 50 while the light radiation $L_D$ is transmitted, by the pair of optical resonators 51, 52 as a whole, to the second optical output 50B$_2$ of the photonic circuit 50.

The first optical detector 54, optically coupled to the first optical output 50B$_1$, provides a first detection signal $S_1$ indicative of the light radiation $L_T$ while the second optical detector 55, optically coupled to the second optical output 50B$_2$, provides a second detection signal $S_2$ indicative of the light radiation $L_D$.

The detection signals $S_1$ and/or $S_2$ are processed by the corresponding control stage $C_1$, $C_N$ to provide the control signal CT and the measurement signal M.

The adjustment element 53 receives a control signal CT from the corresponding control stage 3$_1$, 3$_N$.

In the embodiment of FIG. 4, said control signal is configured to adjust the optical path length $\ell_1$ of the first portion 51 of optical resonator so that the optical power of the light radiation $L_T$, transmitted only by the optical output 50B$_1$, takes on a maximum value when the second optical path length $\ell_2$ of the second optical structure 52 varies due to the target substance absorbed by the active region 520.

In the embodiment of FIG. 5, the control signal CT is configured to adjust the optical path length $\ell_1$ of the first portion 51 of optical resonator so that the optical power of the light radiation LD, transmitted only by the optical output 50B$_2$, takes on a minimum value when the second optical path length $\ell_2$ of the second optical structure 52 varies due to the target substance absorbed by the active region 520.

In the embodiment of FIG. 6, the control signal CT is configured to adjust the optical path length $\ell_1$ of the first portion 51 of optical resonator so that a difference ΔP in optical power between the light radiations $L_T$, $L_D$ transmitted by the optical outputs 50B$_1$, 50B$_2$ takes on a constant value, preferably null, when the second optical path length $\ell_2$ of the second optical structure 52 varies due to the target substance absorbed by the active region 520.

In response to the control signal CT, the adjustment element 53 modifies the refraction index $n_1$ of the material of the first optical resonator 51 so as to vary the optical path length $\ell_1$ of said resonator. For said purpose, the adjustment element 53 can, for example, inject or empty charge carriers into or from the waveguide of the first optical resonator 51 or heat the material of the first optical resonator 51.

Before actual operational use of the optoelectronic device, the adjustment element 53 can be advantageously calibrated to preliminarily adjust the path length $\ell_1$ of the first optical resonator 51 or for the refraction index $n_1$ of the material of the first optical resonator 51.

EMBODIMENT #2

Figure 7:
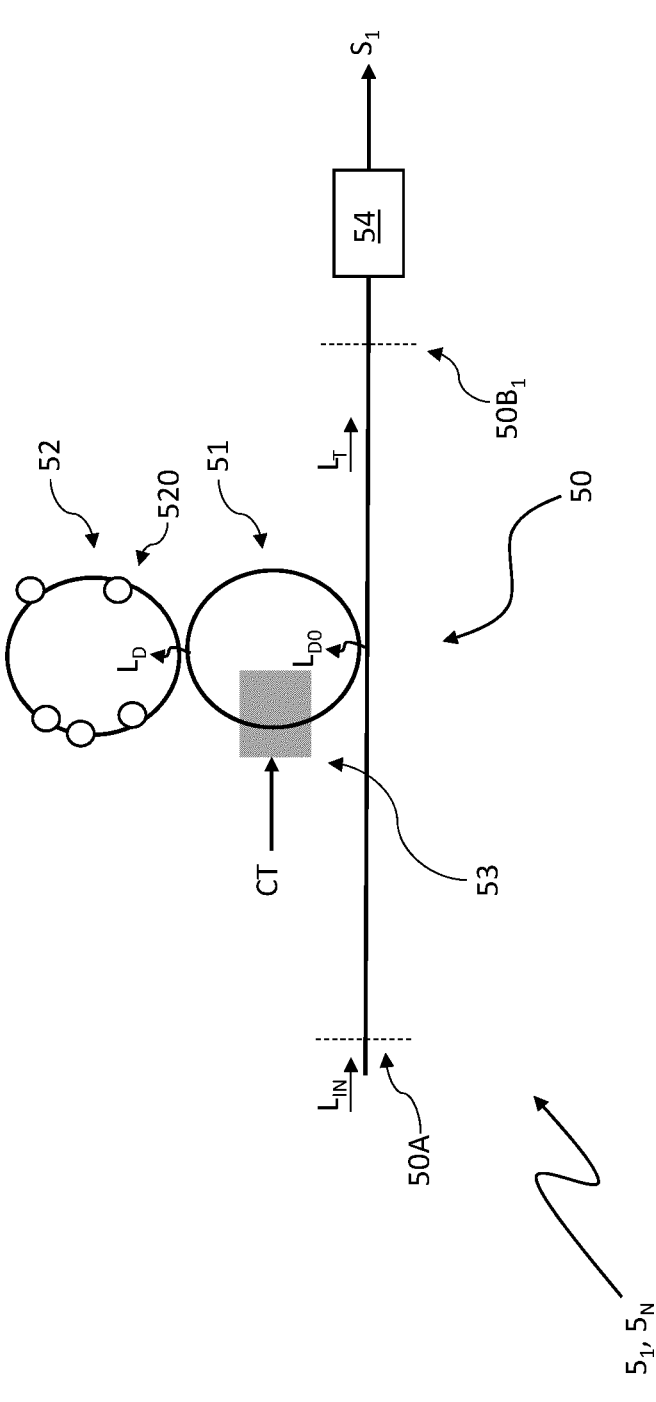
Figure 8:
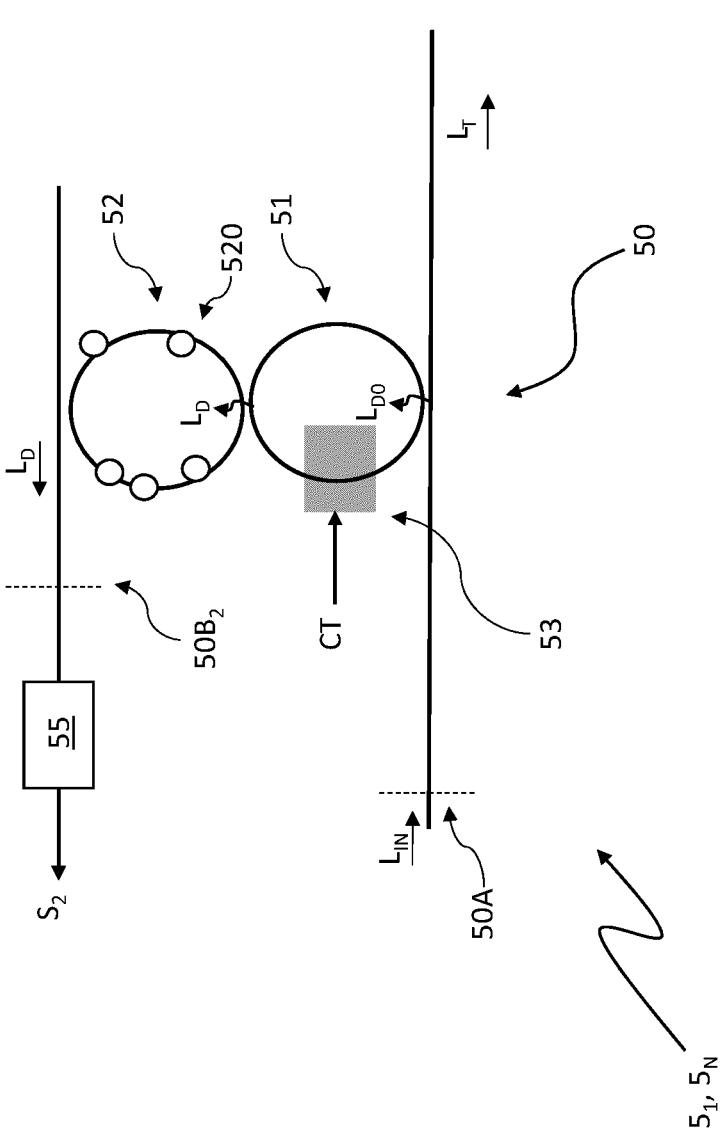

FIGS. 7-9 illustrate another possible embodiment of the invention.

According to said solution, the photonic circuit 50 comprises a first optical resonator 51 that includes a first ring optical path and a second optical resonator 52 that includes a second ring optical path.

The first optical resonator 51 forms the first optical structure while the second optical resonator 52 forms the second optical structure.

The optical resonators 51, 52 are optically coupled to each other.

Only the first optical resonator 51 is optically coupled to the optical input 50A.

The adjustment element 53 for adjusting the optical path length, for example formed of a PIN diode coupled to the waveguide of the first optical resonator 51 or formed of a heating element, is arranged at the first optical resonator 51.

The second optical resonator 52 comprises an active region 520 designed to come into contact with the fluid in which the target substance is dispersed.

According to the variation of FIG. 7, the photonic circuit 50 comprises only a first optical output $50B_1$ optically coupled to the optical input 50A. In this case, the detection stage $5_1$, $5_N$ comprises only a first optical detector 54 optically coupled to the first optical output $50B_1$.

According to the variation of FIG. 8 (dual with respect to that of FIG. 7), the photonic circuit 50 comprises only a second optical output $50B_2$ optically coupled to the second optical resonator 52. In this case, the detection stage $5_1$, $5_N$ comprises only a second optical detector 55 optically coupled to the second optical output $50B_2$.

According to the variation of FIG. 9, the photonic circuit 50 comprises a first optical output $50B_1$ optically coupled to the optical input 50A and a second optical output $50B_2$ optically coupled to the second optical resonator 52. In this case, the detection stage $5_1$, $5_N$ comprises a first optical detector 54 optically coupled to the first optical output $50B_1$ and a second optical detector 55 optically coupled to the second optical output $50B_2$.

Operation of the detection stage $5_1$, $5_N$ is now briefly described.

The photonic circuit 50 receives in input a light radiation $L_{IN}$.

In general, a first portion $L_T$ of the light radiation $L_{IN}$ is not transmitted to the pair of optical resonators 51, 52, while a second portion Loo of the light radiation $L_{IN}$ is transmitted to the first optical resonator 51. The first optical resonator 51 therefore transmits a light radiation $L_D$ to the second optical resonator 52.

The optical path length 12 of the second optical resonator 52 varies when the target substance is absorbed by the active region 520.

Every variation in the optical paths $\ell_1$, $\ell_2$ of the optical resonators 51, 52 entails a power variation in the light radiation $L_T$, not transmitted to the optical resonators 51, 52, and a power variation, inverse to the preceding one, in the light radiation $L_D$ transmitted by the second optical resonator 52.

In the variation of FIG. 7, the light radiation $L_T$ is transmitted only to the optical output $50B_1$ of the photonic circuit 50. The first optical detector 54, optically coupled to the first optical output $50B_1$, thus provides a first detection signal $S_1$ indicative of the light radiation $L_T$.

In the variation of FIG. 8, the light radiation $L_D$ is transmitted, by the optical resonator 52, only to the optical output $50B_2$ of the photonic circuit 50. The second optical detector 55, optically coupled to the second optical output $50B_2$, thus provides a second detection signal $S_2$ indicative of the light radiation $L_D$.

In the variation of FIG. 9, the light radiation $L_T$ is transmitted directly to the first optical output $50B_1$ of the photonic circuit 50, while the light radiation $L_D$ is transmitted, by the optical resonator 52, to the second optical output $50B_2$ of the photonic circuit 50.

The first optical detector 54, optically coupled to the first optical output $50B_1$, provides a first detection signal $S_1$ indicative of the light radiation $L_T$ while the second optical detector 55, optically coupled to the second optical output $50B_2$, provides a second detection signal $S_2$ indicative of the light radiation $L_D$.

The detection signals $S_1$ and/or $S_2$ are processed by the corresponding control stage $C_1$, $C_N$ to provide the control signal CT and the measurement signal M.

The adjustment element 53 receives a control signal CT from the corresponding control stage $3_1$, $3_N$.

In the variation of FIG. 7, said control signal is configured to adjust the optical path length $\ell_1$ of the first portion 51 of optical resonator so that the optical power of the light radiation $L_T$, transmitted only by the optical output $50B_1$, takes on a minimum value when the second optical path length $\ell_2$ of the second optical structure 52 varies due to the target substance absorbed by the active region 520.

In the variation of FIG. 8, said control signal is configured to adjust the optical path length $\ell_1$ of the first portion 51 of optical resonator so that the optical power of the light radiation $L_D$, transmitted only by the optical output $50B_2$, takes on a maximum value when the second optical path length $\ell_2$ of the second optical structure 52 varies due to the target substance absorbed by the active region 520.

In the variation of FIG. 9, said control signal is configured to adjust the optical path length $\ell_1$ of the first portion 51 of optical resonator so that a difference $\Delta P$ in optical power between the light radiations $L_T$, $L_D$ transmitted by the optical outputs $50B_1$, $50B_2$ takes on a constant (preferably null) value when the second optical path length $\ell_2$ of the second optical structure 52 varies due to the target substance absorbed by the active region 520.

In response to the control signal CT, the adjustment element 53 modifies the refraction index $n_1$ of the material of the first optical resonator 51 so as to vary the optical path length $\ell_1$. For said purpose, the adjustment element 53 can, for example, inject or empty charge carriers into or from the waveguide of the first optical resonator 51 or heat the material of the first optical resonator 51.

Before actual operational use of the optoelectronic device, the adjustment element 53 can be advantageously calibrated, for example to preliminarily adjust the path length $\ell_1$ of the first optical resonator 51 or to adjust the refraction index $n_1$ of the material of the first optical resonator 51.

EMBODIMENT #3

Figure 10:
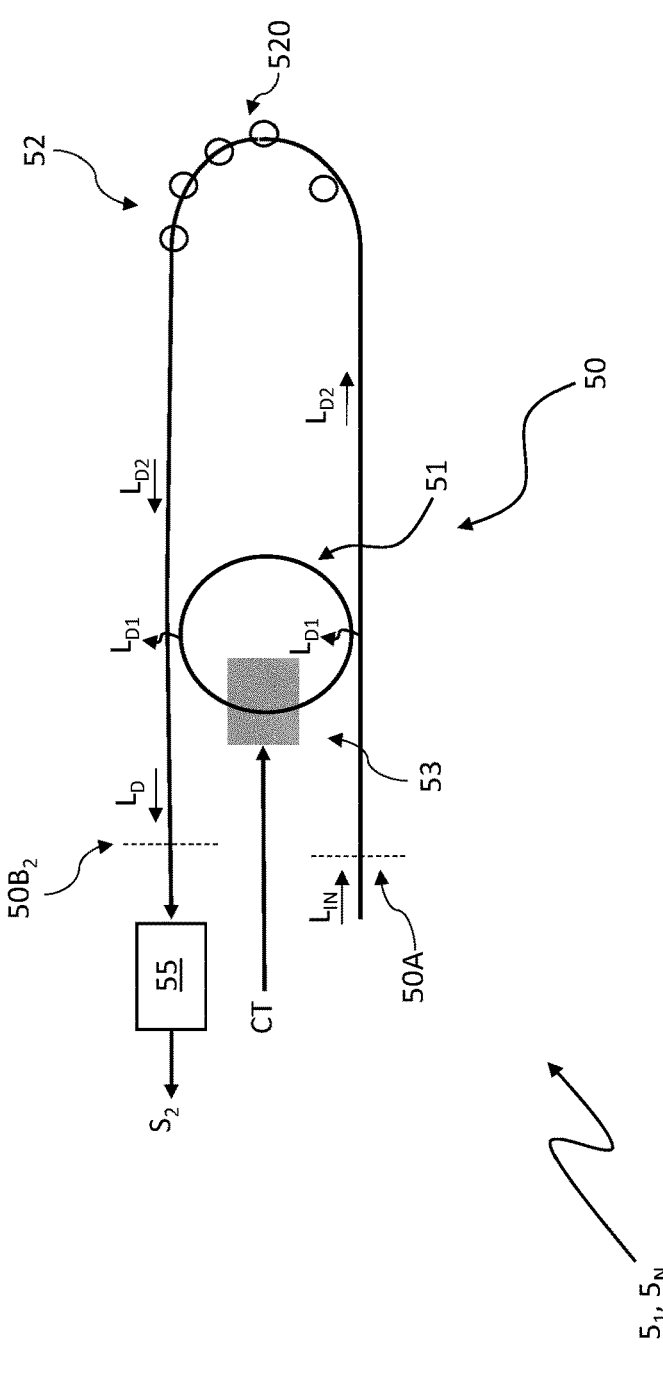

FIG. 10 illustrates another possible embodiment of the invention.

According to said solution, the photonic circuit 50 comprises an optical resonator 51 that includes a ring optical path and an open optical path 52.

The optical resonator 51 forms the first optical structure, while the optical path 52 forms the second optical structure.

Both optical structures 51, 52 are optically coupled to each other, to the optical input 50A and to one single optical output $50B_1$ of the photonic circuit.

The adjustment element 53 of the optical path length, for example formed of a PIN diode coupled to the waveguide of the first optical resonator 51 or formed of a heating element, is arranged at the optical resonator 51.

The optical path 52 comprises an active region 520 designed to come into contact with the fluid in which the target substance is dispersed.

As illustrated above, the optical path length $l_2$ of the optical path 52 varies when the target substance is absorbed by the active region 520.

Operation of the detection stage $5_1$, $5_N$ is now briefly described.

The photonic circuit 50 receives in input a light radiation $L_{IN}$.

A first portion $L_{D1}$ of the light radiation $L_{IN}$ is transmitted to the optical resonator 51.

A second portion $L_{D2}$ of the light radiation $L_{IN}$ travels the optical path 52, passing through the active region 520.

The output optical port $50B_1$ receives a light radiation $L_D=L_{D1}+L_{D2}$ transmitted by the optical structures 51, 52 as a whole.

The optical path length $l_2$ of the optical path 52 varies when the target substance is absorbed by the active region 520.

Every variation in the optical paths $l_1$, $l_2$ of the optical resonators 51, 52 entails a variation in the phase of the light radiation $L_{D2}$ with respect to the light radiation $L_{D1}$.

When transmitted to the optical resonator 51, the light radiation $L_{D2}$ interferes in a constructive or destructive manner with the light radiation $L_{D1}$ as a function of its phase shift with respect to the latter.

The optical power of the light radiation $L_D$ thus varies as a function of the optical path length $l_1$ of the first optical structure 51 and the optical path length $l_2$ of the second optical structure 52. The light radiation $L_D$ is transmitted directly to the optical output $50B_1$ of the photonic circuit 50. The first optical detector 54, optically coupled to the optical output $50B_1$, thus provides a detection signal $S_1$ indicative of the light radiation $L_D$.

Said detection signal is processed by the corresponding control stage $C_1$, $C_N$ to provide the control signal CT and the measurement signal M.

The adjustment element 53 receives a control signal CT from the corresponding control stage $3_1$, $3_N$. Said control signal is configured to adjust the optical path length $l_1$ of the first portion 51 of optical resonator so that the optical power of the light radiation $L_T$, transmitted only by the optical output $50B_1$, takes on a maximum value when the second optical path length $l_2$ of the second optical structure 52 varies due to the target substance absorbed by the active region 520.

In response to the control signal CT, the adjustment element 53 modifies the refraction index n1 of the material of the optical resonator 51 so as to vary the optical path length $l_1$ of the latter. For said purpose, the adjustment element 53 can, for example, inject or empty charge carriers into or from the waveguide of the first optical resonator 51 or heat the material of the first optical resonator 51.

Before actual operational use of the optoelectronic device, the adjustment element 53 can be advantageously calibrated, for example to preliminarily adjust the path length $l_1$ of the first optical resonator 51 or the refraction index n1 of the material of the first optical resonator 51.

EMBODIMENT #4

Figure 11:
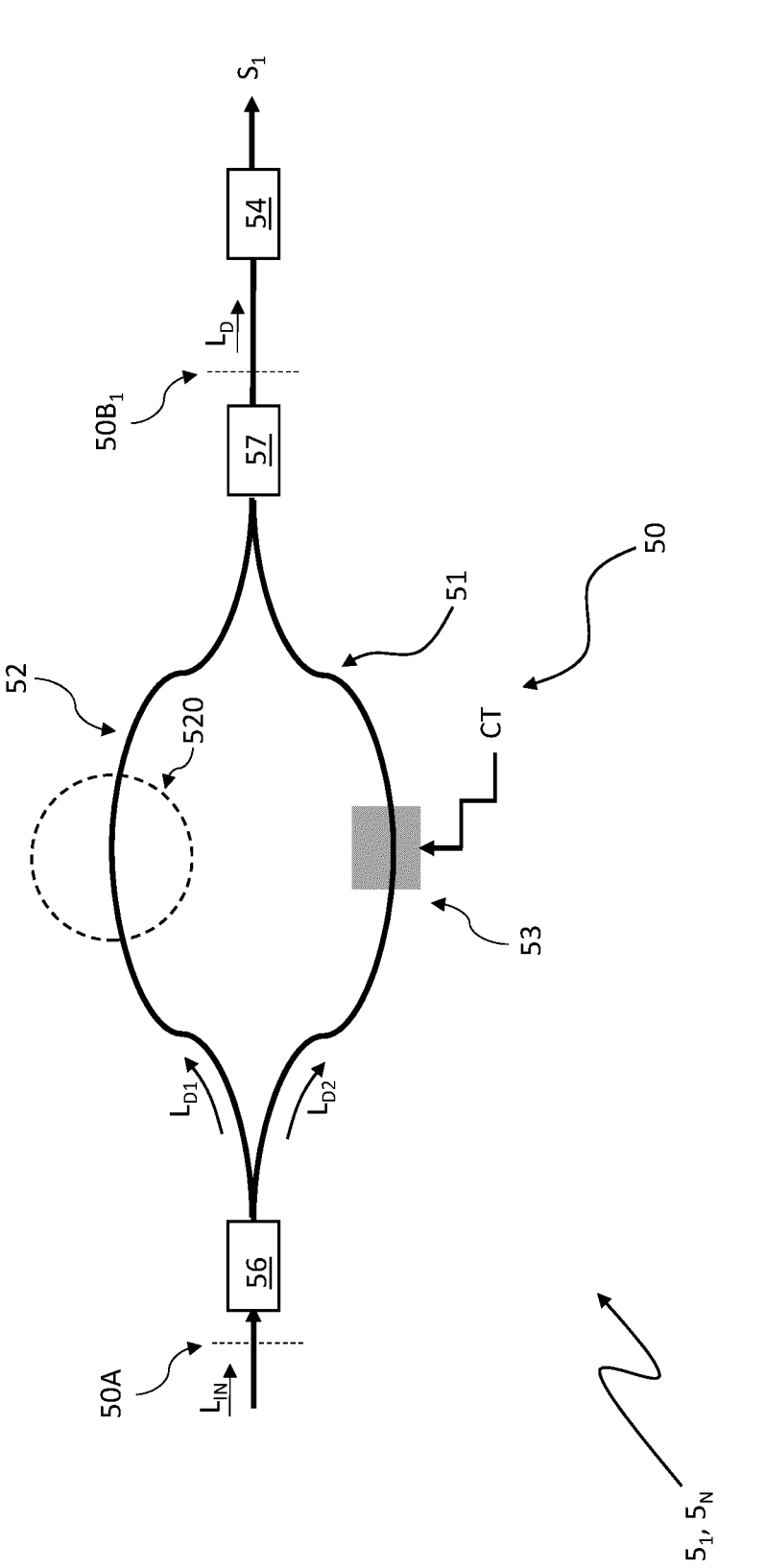

FIG. 11 illustrates another possible embodiment of the invention.

According to said solution, the photonic circuit 50 comprises a beam splitter interferometer, for example a Mach-Zehnder interferometer.

The photonic circuit 50 comprises a beam splitter 56 optically coupled to the optical input 50A and a beam coupler 57 optically coupled to an optical output $50B_1$.

The photonic circuit 50 comprises a first optical path 51 and a second optical path 52 optically coupled in parallel to the optical beam splitter 56 and to the optical beam coupler 57.

The first optical path 51 forms the first optical structure while the second optical path 52 forms the second optical structure.

Preferably, the first optical path 51 is arranged in such a way to come into contact with the fluid in contact with the second optical path 52.

The adjustment element 53 for adjusting the optical path length, for example formed of a PIN diode coupled to the waveguide of the first optical resonator 51 or formed of a heating element, is arranged in the area of the first optical path 51.

The second optical path 52 comprises an active region 520 designed to come into contact with the fluid in which the target substance is dispersed. The optical path length $l_2$ of the second optical path 52 varies when the target substance is absorbed by the active region 520.

Operation of the detection stage $5_1$, $5_N$ is now briefly described.

The photonic circuit 50 receives in input a light radiation $L_{IN}$.

The beam splitter 56 splits the light radiation $L_{IN}$ into a first light portion $L_{D1}$ and a second light portion $L_{D2}$.

A first portion $L_{D1}$ of the light radiation $L_{IN}$ is transmitted to the first optical path 51.

A second portion $L_{D2}$ of the light radiation $L_{IN}$ travels the optical path 52, passing through the active region 520.

The optical coupler 57 recombines the optical radiations $L_{D1}$, $L_{D2}$ and transmits the light radiation $L_D$, obtained from said recombination, to the optical output port $50B_1$.

The optical path length $l_2$ of the optical path 52 varies when the target substance is absorbed by the active region 520.

Every variation in the difference $\Delta l = l_1\ l_2$ between the optical path length $l_1$ of the optical resonator 51 and the optical path length $l_2$ of the optical path 52 entails a variation in the phase of the light radiation $L_{D2}$ with respect to the light radiation $L_{D1}$.

When the light radiations $L_{D1}$, $L_{D2}$ are recombined with each other, in fact, the light radiation $L_{D2}$ interferes in a constructive or destructive manner with the light radiation $L_{D1}$ as a function of its phase shift with respect to the latter.

The optical power of the light radiation $L_D$, transmitted by the optical coupler 57, thus varies as a function of the difference $\Delta l = l_1\ l_2$ between the optical path length $l_1$ of the first optical structure 51 and the optical path length $l_2$ of the second optical structure 52.

The light radiation $L_D$ is transmitted to the optical output $50B_1$ of the photonic circuit 50. The first optical detector 54, optically coupled to the optical output $50B_1$, thus provides a detection signal $S_1$ indicative of the light radiation $L_D$.

Said detection signal is processed by the corresponding control stage $C_1$, $C_N$ to provide the control signal CT and the measurement signal M.

The adjustment element 53 receives the control signal CT from the corresponding control stage $3_1$, $3_N$. Said control signal is configured to adjust the optical path length $\ell_1$ of the first portion 51 of optical resonator so that the optical power of the light radiation $L_D$, transmitted by the optical output $50B_1$, takes on a constant value when the second optical path length $\ell_2$ of the second optical structure 52 varies due to the target substance absorbed by the active region 520.

In response to the control signal CT, the adjustment element 53 modifies the refraction index $n_1$ of the material of the first optical path 51 so as to vary the optical path length $\ell_1$ of the latter. For said purpose, the adjustment element 53 can, for example, inject or empty charge carriers into or from the waveguide of the first optical resonator 51 or heat the material of the first optical resonator 51.

Before actual operational use of the optoelectronic device, the adjustment element 53 can be advantageously calibrated to preliminarily adjust the path length $\ell_1$ of the first optical path 51 or to adjust the refraction index $n_1$ of the material of the first optical path 51.

The optoelectronic device, according to the invention, has significant advantages with respect to the devices of the state of the art.

As illustrated in FIG. 1, the optoelectronic device 1 comprises a plurality of measurement sections $6_1$, $6_N$ arranged in parallel, each operatively coupled to the optical splitter 4 and formed by a corresponding detection stage $5_1$, $5_N$ and by a corresponding control stage $3_1$, $3_N$.

Although it receives the light radiation from the same light source 2, each measurement section $6_1$, $6_N$ operates independently of the others in detecting a different target substance dispersed in its fluid.

The optoelectronic device 1 is therefore a multi-sensing detection device capable of performing in parallel multiple detections of substances dispersed in a fluid.

The optoelectronic device 1 comprises, for each measurement section $6_1$, $6_N$, a feedback circuit that allows adjustment of the optical path length $\ell_1$ of a first optical structure 51 of the corresponding photonic circuit 50 so that the latter constantly follows every variation in the optical path length $\ell_2$ of the second optical structure 52 of the corresponding photonic circuit 50. Each measurement section $6_1$, $6_N$ therefore ensures high performance in terms of measurement accuracy and resolution.

The optoelectronic device 1 comprises a single light source, thus having a very compact structure with reduced overall dimensions.

The optoelectronic device 1 is easy to manufacture at industrial level.

Preferably, it comprises an integrated electronic circuit, on board which are provided the multiple detection stages $5_1$, $5_N$ parallel to one another.

Said integrated electronic circuit can be advantageously produced at industrial level using semiconductor machining technologies of known type. For example, manufacturing of integrated circuits by planar technology, silicon micro-machining technologies (bulk micro-machining or surface micro-machining), or similar, can be used.

The above-mentioned integrated electronic circuit can have dimensions in the order of a few hundred μm or a few mm.

According to some embodiments, the light source 2 and the optical splitter 4 are produced as stand-alone components and are structurally separate from the integrated circuit for production of the detection stages $5_1$, $5_N$.

In some embodiments of the optoelectronic device 1, however, the light source 2 and/or the optical splitter 4 and/or the detection stages $5_1$, $5_N$ may be structurally integrated with one another, if necessary also in one single integrated circuit. Nonetheless, the first and second optical structures 51, 52 of each detection stage are preferably realized as distinct parts of the corresponding photonic circuit.

As illustrated above, the coupling between the various optical components of the optoelectronic device 1 can be provided by means of appropriate waveguides, which can consist of appropriate optic fibres, for example SMF (Single Mode Fibres) with a core having diameter of approximately 10 μm, or of corresponding appropriately machined portions of integrated circuit, for example with a width of approximately 0.5 μm and a length of a few dozen μm.

Also the optical beam separators or the optical beam couplers on board the optoelectronic device can consist of stand-alone components or corresponding portions of appropriately machined integrated circuit.

As illustrated above, each control stage $3_1$, $3_N$ of the optoelectronic device 1 comprises one or more control modules which can be industrially produced analogically and/or digitally.

If implemented analogically, said control modules can comprise electronic circuits (separated into distinct units or integrated with one another) arranged so as to perform the desired functions.

If implemented digitally, said control modules can comprise one or more signal digital processing units (for example microprocessors) and appropriate memory supports storing software instructions that can be executed by said digital processing units to carry out the desired functions.

The control stages $3_1$, $3_N$ can be integrated in one single control unit, if necessary also comprising the controller 12, operatively associated with the optical splitter 4. Said control unit can be produced industrially using electronic circuit assembly technologies of known type (for example assembly on PCB) or structurally integrated with the other components of the optoelectronic circuit 1 in a single integrated circuit.

Based on the above, it is evident that the optoelectronic device 1 is particularly suited to reproduction on a large scale.

As illustrated above, many of its parts can be integrated with one another and produced by means of semiconductor processing technologies of known type.

The optoelectronic device 1 is particularly suitable for use in equipment for the detection of substances dispersed in a fluid and in biomedical equipment.

The invention claimed is:

1. An opto-electronic device for the detection of substances dispersed in a fluid, the opto-electronic device comprising:

a light source configured to emit a light radiation;

an optical splitter comprising an optical input port optically coupled to the light source and a plurality of optical output ports, the optical splitter configured to receive a first light beam at the optical input port and to provide one or more second light beams, each transmissible from a corresponding optical output port;

a plurality of detection stages operatively coupled to the optical splitter and arranged in parallel with each other, each detection stage including a photonic circuit configured to receive a light radiation from the optical splitter and to transmit at least one light radiation in output, each photonic circuit comprising:

an optical input optically coupled to a corresponding output optical port of the optical splitter;

a first optical structure optically coupled to the optical input and having a first optical path length;

a second optical structure optically coupled to the first optical structure and having a second optical path length, the second optical structure comprising an active region configured to come into contact with a fluid, in which a target substance is dispersed, and to selectively absorb the target substance, the second optical path length of the second optical structure varying when the active region absorbs the target substance;

an adjustment element of the optical path length operatively coupled to the first optical structure and configured to adjust the first optical path length of the first optical structure in response to an input control signal; and at least one optical output optically coupled to the optical input, the first optical structure, and the second optical structure;

wherein each detection stage further includes at least one optical detector optically coupled with the at least one optical output, each optical detector configured to provide a detection signal indicative of an optical power of a light radiation transmitted by a corresponding optical output;

a plurality of control stages arranged in parallel with each other, each control stage being operatively coupled to a corresponding detection stage and configured to receive and process at least one detection signal provided by at least one optical detector of the detection stage, and to provide, in response to the at least one detection signal:

a control signal for the adjusting element of the photonic circuit of the corresponding detection stage, the control signal being configured to adjust the first optical path length of the first optical structure of the photonic circuit wherein the optical power of light radiation transmitted by at least an optical output of the photonic circuit has a desired value, when the second optical path length of the second optical structure of the photonic circuit varies due to the target substance absorbed by the active region; and a measurement signal indicative of a presence or concentration of the target substance in the fluid in contact with the active region of the second optical structure.

2. The opto-electronic device of claim 1, wherein the optical splitter comprises a plurality of optical paths configured to couple the optical input port with the optical output ports.

3. The opto-electronic device of claim 2, wherein the optical splitter comprises a plurality of optical switches configured to select an optical path of the optical splitter.

4. The opto-electronic device of claim 1, wherein each photonic circuit comprises:

a first optical resonator having a first ring optical path and optically coupled to the optical input, the first optical structure being formed by the first optical resonator; and a second optical resonator having a second optical ring path and optically coupled to the optical input, the second optical structure being formed by the second optical resonator.

5. The opto-electronic device of claim 4, wherein each photonic circuit comprises:

a first optical output optically coupled to the optical input, the detection stage comprising a first optical detector optically coupled to the first optical output.

6. The opto-electronic device of claim 4, wherein each photonic circuit comprises:

a second optical output optically coupled to the first and second optical resonator, the detection stage comprising a second optical detector optically coupled to the second optical output.

7. The opto-electronic device of claim 4, wherein each photonic circuit comprises:

a first optical output optically coupled to the optical input and a second optical output optically coupled to the first and second optical resonator, the detection stage comprising a first optical detector and a second optical detector optically coupled to the first optical output and to the second optical output, respectively.

8. The opto-electronic device of claim 1, wherein each photonic circuit comprises:

a first optical resonator having a first ring optical path and optically coupled to the optical input, the first optical structure being formed by the first optical resonator; and a second optical resonator having a second optical ring path and optically coupled to the first optical resonator, the second optical structure being formed by the second optical resonator.

9. The opto-electronic device of claim 8, wherein each photonic circuit comprises:

a first optical output optically coupled to the optical input, the detection stage comprising a first optical detector optically coupled to the first optical output.

10. The opto-electronic device of claim 8, wherein each photonic circuit comprises:

a second optical output optically coupled to the second optical resonator, the detection stage comprising a second optical detector optically coupled to the second optical output.

11. The opto-electronic device of claim 8, wherein each photonic circuit comprises:

a first optical output optically coupled to the optical input and a second optical output optically coupled to the second optical resonator, the detection stage comprising a first optical detector and a second optical detector optically coupled to the first optical output and to the second optical output, respectively.

12. The opto-electronic device of claim 1, wherein each photonic circuit comprises:

an optical resonator having a ring optical path and optically coupled to the optical input and to an optical output of the photonic circuit, the first optical structure being formed by the optical resonator; and a further optical path optically coupled to the optical input and to the optical output, the second optical structure being formed by the further optical path.

13. The opto-electronic device of claim 1, wherein each photonic circuit comprises:

an optical beam splitter optically coupled to the optical input;

an optical beam coupler optically coupled to an optical output of the photonic circuit; and a first optical path optically coupled to the optical beam splitter and to the optical beam coupler, the first optical structure being formed by the first optical path; and a second optical path optically coupled to the optical beam splitter and to the optical beam coupler, in parallel to the first optical path, the second optical structure being formed by the second optical path.

14. The opto-electronic device of claim 1, wherein the first optical structure is arranged to come in contact with the fluid.

15. The opto-electronic device of claim 1, wherein the measurement signal is calculated based on the control signal.

16. The opto-electronic device of claim 1, wherein the first and second optical structures are realized as distinct parts of the photonic circuit.

17. The opto-electronic device of claim 1, wherein the light source comprises a laser light emitter.

18. The opto-electronic device of claim 1, wherein the light source is configured to emit a light radiation with a constant wavelength.

19. The opto-electronic device of claim 1, wherein the light source is configured to emit a light radiation with a wavelength that varies periodically in a neighbourhood of a predefined wavelength.

\* \* \* \* \*